2,967,174

PROCESS FOR THE PRODUCTION OF POLYMERIZATION PRODUCTS

Herbert Bartl, Koln-Stammheim, Germany, assignor to Farbenfabriken Bayer Aktiengesellschaft, Leverkusen, Germany, a corporation of Germany No Drawing. Filed Mar. 15, 1956, Ser. No. 571,607

Claims priority, application Germany Mar. 24, 1955

7 Claims. (Cl. 260—78.5)

This invention relates to a process for the production of polymerization products.

The present invention provides a process for the production of polymerization products wherein an aliphatic conjugated diolefin is co-polymerized with a polymerizable $\alpha,\beta$-ethylene dicarboxylic acid derivative having a free carboxylic acid group with the inclusion of maleic anhydride and maleic imide in the homogeneous phase with the aid of a free-radical-forming substance; in this way valuable products can be obtained.

Examples of suitable aliphatic conjugated diolefins for use in the process of the invention are such which have 4 to 6 carbon atoms as for instance butadiene and its homologues, and derivatives such as isoprene, chloroprene, 2.3-dimethylbutadiene. Examples of polymerizable derivatives of $\alpha,\beta$-ethylene-dicarboxylic acids are the half esters, half amides or substituted half amides of maleic acid, fumaric acid, itaconic acid or citraconic acid, such as for example the monomethyl, monoethyl, monobutyl, monohexyl, monododecyl, monooctadecyl, monophenylethyl and monocyclohexyl esters of maleic and fumaric acid, N-isopropyl-mono-maleic amide, and N-dodecyl-mono-maleic amide. Preferably the proportions of the monomers are so chosen that 1 to 2 mols of the conjugated diolefinic compound are used to 1 mol of the $\alpha,\beta$-ethylene-dicarboxylic acid derivative. It is of course also possible to use mixtures of the monomers of each of the two classes of substances.

The polymerization may be carried out in the presence of further polymerizable olefinic compounds such as the corresponding diesters and diamides of the aforementioned $\alpha,\beta$-ethylenically unsaturated dicarboxylic acid derivatives, vinylesters, such as vinylacetate, vinylchloride, vinylidenechloride, esters of $\alpha,\beta$-ethylenically unsaturated monocarboxylic acids, such as acrylic acid and methacrylic acid esters with aliphatic and cycloaliphatic alcohols having 1–18 carbon atoms such as the methyl, ethyl, isopropyl, octadecyl, cyclohexyl esters of said acids, furthermore styrene, and derivatives of styrene such as $\alpha$-methylstyrene, 1-vinyl-4-chlorobenzene and isobutylene. In this case the proportions of the monomers are preferably so chosen that 0.5 to 2 mols of the conjugated diolefinic compound and 0.01–1 mol of the further monoolefinic compounds are used to 1 mol of the $\alpha,\beta$-ethylene-dicarboxylic acid derivative.

Polymerization takes place in the homogeneous phase, for example it can take place in an organic solvent, such as an alcohol, ester, ketone, ether or aromatic or aliphatic hydrocarbons, provided that all the monomers are soluble therein, such as for example butanol, ethyl and butyl acetate, benzene, toluene, xylene, cyclohexane, benzine, dioxane, acetone and methyl-ethyl ketone. If the conjugated diolefinic compound is soluble in the $\alpha,\beta$-ethylene-dicarboxylic acid derivatives itself, the polymerization can even be carried out without the concurrent use of a separate solvent.

The conventional peroxidic or readily decomposable nitrogenous substances can be used as the free-radical-forming substances, such as benzoyl peroxide, lauroyl peroxide, tertiary butyl hydroperoxide and azodiisobutyric acid nitrile. It is also possible to use redox systems: the polymerization temperature, which otherwise is preferably between 60 and 130° C., can then be lowered considerably.

When the process of the invention is carried out, it has proved to be advantageous for the polymerization to be started as quickly as possible, so that the conjugated diolefinic compound is not heated jointly with the $\alpha,\beta$-ethylene-dicarboxylic acid derivative for a relatively long time without a polymerization reaction taking place. This can be achieved for example by heating the polymerizable $\alpha,\beta$-ethylene-dicarboxylic acid derivative with the free-radical-forming substance for a time at the temperature necessary for polymerization and before the conjugated diolefin, if desired, together with the further monoolefinic compound, is added. Otherwise, a considerable part of the diolefinic monomer may react as in a diene synthesis to form undesired cyclic compounds of low molecular weight. By a subsequent controlled addition of the conjugated diolefinic compound at the rate at which polymerization proceeds, it is moreover surprisingly easy so to supervise the course of the polymerization that no uncontrolled rise in temperature can occur.

Another advantageous embodiment of the process consists in heating the polymerizable $\alpha,\beta$-ethylene-dicarboxylic acid derivative at the polymerization temperature, prior to adding the conjugated divinyl compound, in the presence of the free-radical-forming substance and also a small proportion of at least one of the further monoolefinic compounds, such as styrene or a vinyl ester, for example vinyl acetate, which polymerizes easily with the $\alpha,\beta$-ethylene dicarboxylic acid derivative. By this means, the copolymerization is initiated by compounds which do not produce any diene synthesis. On subsequently adding the conjugated diolefinic compound, polymerization leading exclusively to products of high molecular weight takes place. It is sufficient to use up to about $\frac{1}{10}$ mol of the vinyl compound to 1 mol of a $\alpha,\beta$-ethylene-dicarboxylic acid derivative.

The polymers which are obtained are products which have interesting technical uses and which have a surprisingly good solubility. The properties of the polymerization products can be varied to a great extent, depending on the choice of monomers.

Depending on the nature of the alkyl radicals of the monoesters, there are obtained solid elastic products which are suitable for lacquers, tacky soft substances which are suitable as an adhesive with a strong adhesive power, or products which are such that they are insoluble in water, but readily dissolve in dilute alkalies, and can be used as soluble coatings or sizing agents. Since these polymerization products contain double bonds and free carboxyl groups, these can be used for further reactions, whereby products are obtained which have novel properties. For example, by adding alcohols and acid catalysts to the solution of the copolymer and heating said solution to temperatures of about 60–120° C., the carboxyl groups of the polymers can be esterified. Products with similar properties can also be obtained if the conjugated diolefinic compounds are polymerized with maleic anhydride and the polymers are subsequently esterified. By reacting with polyamines of polyalcohols, such as for example ethylene diamine, diethylene triamine, trimethylol propane or pentaerythritol, the polymers can be converted into insoluble products. After spreading the solution, evaporating the solvent and heating the film obtained to temperatures of about 80–130° C., if desired, in the presence of vulcanizing agents, the copolymers are insolubilized.

Example 1

1300 parts of maleic monooctadecyl ester, 300 parts of styrene, 100 parts of maleic didodecyl ester and 300 parts of butadiene, as well as 10 parts of moist benzoyl peroxide, are heated at 90° C. in an autoclave equipped with a stirrer mechanism. Polymerization is initiated suddenly after 10–15 minutes, the temperature of the reaction mixture rising to 165° C. A soft mass is formed which, dissolved in xylene, can be emulsified with a diluted aqueous solution of caustic sodium carbonate and can be used for impregnating textiles or leather.

Example 2

1720 parts of maleic monobutyl ester are placed in a pressure vessel and heated together with 2 parts of benzoyl peroxide for 15 minutes at 90° C. A mixture of 600 parts of butadiene, 2300 parts of butyl acetate and 20 parts of benzoyl peroxide are then introduced into the reaction chamber at the rate at which the heat of polymerization liberated can be dissipated without difficulty and the polymerization temperature ranges between 90 and 95° C. The pressure in the reaction vessel during this operation does not exceed 5 to 6 atm. After the butadiene has been added, the mixture is finally polymerized for 10 hours at 90° C. A viscous clear solution is formed. 92% of the monomers used are polymerized. The polymer isolated by evaporation of the solvent is a colorless and somewhat tacky mass. The viscosity factor ($\eta$) of the dissolved substance is 1.53. The product is very suitable as an adhesive, for example for glass.

Example 3

1300 parts of maleic monomethyl ester are placed in a pressure vessel and heated together with 1 part of benzoyl peroxide and 104 parts of styrene for 15 minutes at 90° C. A mixture of 540 parts of butadiene, 1944 parts of methyl alcohol and 19 parts of benzoyl peroxide is then introduced under pressure into the reaction chamber at the rate at which the heat of polymerization being liberated can be dissipated without difficulty and the polymerization temperature ranges between 90 and 95° C. On completion of the addition of butadiene, the mixture is finally polymerized for 10 hours at 90° C. A solid elastic mass can be isolated from the polymer solution, and this mass dissolves readily in dilute alkali. The product is suitable, inter alia, as a sizing agent. If a catalyst, such as p-toluene-sulphonic acid, is added to a solution of the polymer in methyl alcohol, the free carboxyl groups can be converted into methyl ester groups by subsequent heating.

Example 4

2000 parts of maleic monocyclohexyl ester are heated jointly with 104 parts of styrene and 1 part of benzyl peroxide for 15 minutes at 90° C. in a pressure vessel. A mixture of 540 parts of butadiene, 2000 parts of xylene and 24 parts of benzoyl peroxide is then forced in under pressure at the rate at which the heat of polymerization being liberated can be dissipated without difficulty and the polymerization temperature ranges between 90 and 95° C. The mixture is finally polymerized for 10 hours at 90° C. after the butadiene has been added. A viscous solution is formed which dries on to form rigid clear films. The polymer is very suitable for the production of coatings of all types on wood, metal and fabrics.

Example 5

1430 parts of maleic monododecyl ester are heated with 50 parts of styrene and 1 part of benzoyl peroxide for 15 minutes at 90° C. in a pressure vessel, and then a mixture of 300 parts of butadiene, 1000 parts of xylene and 17 parts of benzoyl peroxide is forced into the reaction chamber at a rate at which the heat of polymerization being liberated can be dissipated without difficulty and the polymerization temperature ranges between 95–100° C. The mixture is finally polymerized for 10 hours at 90° C. after completion of the addition of butadiene. The isolated polymer is a clear and somewhat tacky elastic mass, which dissolves satisfactorily in aliphatic hydrocarbons. The product can be used, inter alia, as an emulsifier or for impregnating textiles or leather. The free carboxyl groups of the polymer can be still further esterified with dodecyl alcohol, a highly viscous mass being formed which can be used as a plasticizer, a lubricant or a lubricant additive.

Example 6

980 parts of maleic anhydride, 1000 parts of dioxane, 50 parts of styrene and 0.5 part of benzoyl peroxide are heated for 15 minutes at 90° C., in a stirrer-type autoclave. A mixture of 650 parts of butadiene, 1000 parts of dioxane and 10 parts of benzoyl peroxide is then forced into the reaction chamber at a rate at which the heat of polymerization liberated can be dissipated without difficulty and the polymerization temperature ranges between 90 and 100° C. After completion of the addition of butadiene, the mixture is finally polymerized for 10 hours at 90° C. A viscous clear solution is formed, which dries as a hard brittle film. The reactive polymer can be reacted, for example, with primary and secondary alcohols or primary or secondary amines to form novel products.

Example 7

1720 parts of maleic monobutyl ester are heated together with 104 parts of styrene and 1 part of benzoyl peroxide for 15 minutes at 90° C., and then a mixture of 980 parts of chloroprene, 2000 parts of butyl acetate and 22 parts of benzoyl peroxide is forced into the reaction chamber at a rate at which the heat of polymerization liberated can be dissipated without difficulty and the temperature of polymerization ranges between 80 and 95° C. The isolated product has a high degree of tackiness and can be used as an adhesive.

Example 8

1500 parts of maleic monobutyl ester, 250 parts of fumaric dibutyl ester, 104 parts of styrene and 1 part of benzoyl peroxide are heated for 15 minutes at 90° C. in a pressure vessel. 980 parts of chloroprene, 2000 parts of butyl acetate and 22 parts of benzoyl peroxide are added as in Example 7. A soft, tacky product is likewise formed.

What I claim is:

1. A process for producing an interpolymer soluble in organic solvents which comprises heating in the presence of a free radical-forming polymerization catalyst, a mixture of (a) one mol of a monoester of maleic acid and a hydrocarbon monohydric alcohol which has 1–18 carbon atoms and is devoid of aliphatic carbon-to-carbon unsaturation and (b) 0–1 mol of a further polymerizable monoethylenically unsaturated compound selected from the group consisting of styrene, styrene bearing inert substituents, vinyl acetate, vinyl chloride, vinylidene chloride and isobutylene, the heating of said mixture being sufficient to attain a temperature at which the mixture is copolymerizable with a conjugated diene selected from the group consisting of a conjugated aliphatic diolefin of 4–6 carbon atoms and chloroprene, and then adding 0.5–2 mols of said conjugated diene to said reaction mixture while maintaining the latter under said copolymerizing conditions, the diene being slowly added at the rate at which it is consumed by polymerization, thereby forming the high molecular weight interpolymer.

2. Process of claim 1 wherein said monoester is monobutyl maleate.

3. Process of claim 1 wherein said monoester is monododecyl maleate.

4. Process of claim 1 wherein said first and second monomers in the initial mixture are styrene and the monomethyl ester of maleic acid, and the diolefin is butadiene.

5. Process of claim 1 wherein said first and second monomers in the initial mixture are styrene and the monocyclohexyl ester of maleic acid, and the diolefin is butadiene.

6. Process of claim 1 wherein said first and second monomers in the initial mixture are styrene and the monododecyl ester of maleic acid, and the diolefin is butadiene.

7. Process of claim 1 wherein said first and second monomers in the initial mixture are styrene and the monobutyl ester of maleic acid, and the diene is chloroprene.

References Cited in the file of this patent

UNITED STATES PATENTS

| | | |
|---|---|---|
| 2,384,239 | Dorough | Sept. 4, 1945 |
| 2,384,569 | Semon | Sept. 11, 1945 |
| 2,471,818 | Hunter et al. | May 31, 1949 |
| 2,540,072 | Hays | Jan. 30, 1951 |
| 2,583,326 | D'Alelio | Jan. 22, 1952 |
| 2,600,680 | Park | June 17, 1952 |
| 2,643,987 | Harrison et al. | June 30, 1953 |
| 2,647,886 | Seymour | Aug. 4, 1953 |
| 2,710,292 | Brown | June 7, 1955 |
| 2,810,716 | Markus | Oct. 22, 1957 |
| 2,849,426 | Miller | Aug. 26, 1958 |

OTHER REFERENCES

Heiligmann et al.: Ind. and Eng. Chem., vol. 41, pp. 113–116 (January 1952).

Starkweather et al.: Ind. and Eng. Chem., vol. 39, #2 (1947), p. 219.

Schildknecht: Polymer Processes, Interscience (1956), p. 52.